United States Patent [19]

Smorol

[11] 4,228,846
[45] Oct. 21, 1980

[54] CONTROL APPARATUS FOR A TWO-SPEED HEAT PUMP

[75] Inventor: Michael E. Smorol, Syracuse, N.Y.

[73] Assignee: Carrier Corporation, Syracuse, N.Y.

[21] Appl. No.: 930,259

[22] Filed: Aug. 2, 1978

[51] Int. Cl.³ ............................................. F25B 13/00
[52] U.S. Cl. ......................................... 165/2; 165/28;
  165/29; 62/160; 62/228; 236/91 D
[58] Field of Search ..................... 62/175, 215, 228 B,
  62/229, 160; 236/1 EA, 91 D; 165/28, 29, 27, 2

[56] References Cited
U.S. PATENT DOCUMENTS

| | | | |
|---|---|---|---|
| 2,718,119 | 9/1955 | Prince | 62/229 |
| 3,318,372 | 5/1967 | Shell | 165/29 |
| 3,324,672 | 6/1967 | Sones et al. | 62/228 B |
| 3,556,203 | 1/1971 | Kyle | 165/29 |
| 3,978,382 | 8/1976 | Pfarrer et al. | 318/221 R |
| 4,041,452 | 8/1977 | Pfarrer et al. | 361/27 |
| 4,105,064 | 8/1978 | Del Toro et al. | 165/29 |

*Primary Examiner*—Albert W. Davis
*Assistant Examiner*—Margaret A. Focarino
*Attorney, Agent, or Firm*—J. Raymond Curtin; Robert P. Hayter

[57] ABSTRACT

Apparatus and a method for controlling the operation of a multiple speed heat pump air conditioning system. Circuitry is provided to regulate the heat pump compressor motor for multiple speed compressor operation in both the cooling and heating modes of operation. Additional electric resistance heaters are controlled by the circuitry to supply heating needs unsatisfied by heat pump operation.

12 Claims, 2 Drawing Figures

CONTROL APPARATUS FOR A TWO-SPEED HEAT PUMP

BACKGROUND OF THE INVENTION

1. Field of the Invention

The present invention relates to an apparatus and method for controlling the operation of a multiple speed heat pump system for supplying cooling and heating to an enclosure. More particularly, the present invention relates to the specific circuitry and method of staging multiple speed operation and in ascertaining under what conditions the various modes of operation should be selected for a heat pump system.

2. Description of the Prior Art

Two-speed compressors have been known in the art and utilized with refrigeration equipment to provide for staged capacity control. Most of these prior uses have involved heavy industrial and commercial equipment and only recently has the residential market been involved with multiple speed compressors. The control circuit claimed herein is specifically designed to be utilized with a two speed compressor having auxiliary electrical heat as part of the heating and cooling system for use in a residential enclosure. The claimed invention herein is not to be limited to residential use but finds like applicability in other types and forms of staged compressor refrigeration systems.

Typical of the prior art in this area is U.S. Pat. No. 3,978,382 issued to Pfarrer et al entitled "Control Apparatus for Two-Speed Single Phase Compressor". Therein a combination mechanical and electrical interlock is utilized to assure that the compressor is operating at either high speed or low speed and not a combination of both. This patent discloses a partial control system incorporating this combination mechanical-electrical interlock. The 3,978,382 patent does not however disclose the various controls for deciding which mode of operation should be utilized to most efficiently provide heating or cooling to the enclosure to be conditioned. This patent is more generally directed toward internal protection devices for the two speed compressor and the combination electrical mechanical interlock. U.S. Pat. No. 4,041,542 discloses a similar system for use with the three phase power supply. Again, there is no specific disclosure of incorporating the various control mechanisms into the control system of the unit to select the appropriate modes of operation.

The control circuit as described herein provides for phased speed operation dependent upon the heating demand sensed within the enclosure, upon the outdoor temperature and upon the mode of operation of the unit. Electrical resistance heaters are also staged into this system to provide additional heating under the appropriate weather conditions.

SUMMARY OF THE INVENTION

It is an object of the invention to provide a control system for a multi-speed compressor incorporated with a reversible vapor compression refrigeration system.

It is a further object of the present invention to provide a multiple stage thermostat in combination with a multiple speed compressor such that the compressor speeds are cycled depending upon the stage of heating or cooling need sensed.

It is another object of the present invention to provide a control circuit to automatically switch the compressor into high speed operation upon the outdoor ambient air temperature falling below a predetermined level.

It is a yet further object of the present invention to provide electrical resistance heaters in combination with a multiple speed heat pump such that when the unit is in the heating mode of operation electrical resistance heaters are automatically energized to supply additional heat energy when the outdoor air temperature falls below a predetermined level.

It is a further object of the present invention to provide a mechanical interlock which prevents the compressor from being operated simultaneously at both high speed and low speed.

It is a still further object of the present invention to provide a time delay between switching from low speed to high speed operation.

It is yet another object of the present invention to bypass a low pressure switch when the unit is operated in defrost mode of operation.

It is a further object of the present invention to provide a safe, economical, reliable, easy to manufacture and service control system for regulating operation of a multi-speed heat pump capable of heating and cooling an enclosure.

The above objects are achieved according to a preferred embodiment of the invention by the provision of a thermostat having multiple temperature sensors for ascertaining a first level need for cooling and heating and a second level need for cooling and heating. The compressor motor is operated in the first speed when the first level heating or cooling need is sensed and at the second speed when the second level heating or cooling need is sensed. A speed control thermostat is arranged to energize the compressor at high speed when the outdoor ambient air temperature is within a predetermined range notwithstanding only a first level heating need being sensed. Furthermore, in the heating mode of operation when the outdoor ambient air temperature falls below certain temperature levels, electrical resistance heaters are energized to supply additional heat to the enclosure. High speed and low speed compressor relays are provided to energize the appropriate windings within the compressor motor such that the compressor may be operated at both speeds. Energization of the compressor high speed relay and the compressor low speed relay is depenent upon the relative positions of the low speed relay and the high speed relay energized by the various temperature sensing elements of the thermostat. A defrost thermostat is further provided in combination with a defrost timer, multiple defrost relays and a defrost thermostat relay to provide for reverse cycle operation to melt the frost on the outdoor heat exchanger under the appropriate conditions.

DESCRIPTION OF THE PREFERRED EMBODIMENT

The invention will be described herein with reference to a specific preferred embodiment. It is to be understood that this invention has like applicability to similar forms of multiple speed refrigeration and air conditioning control circuits.

Figure 1:
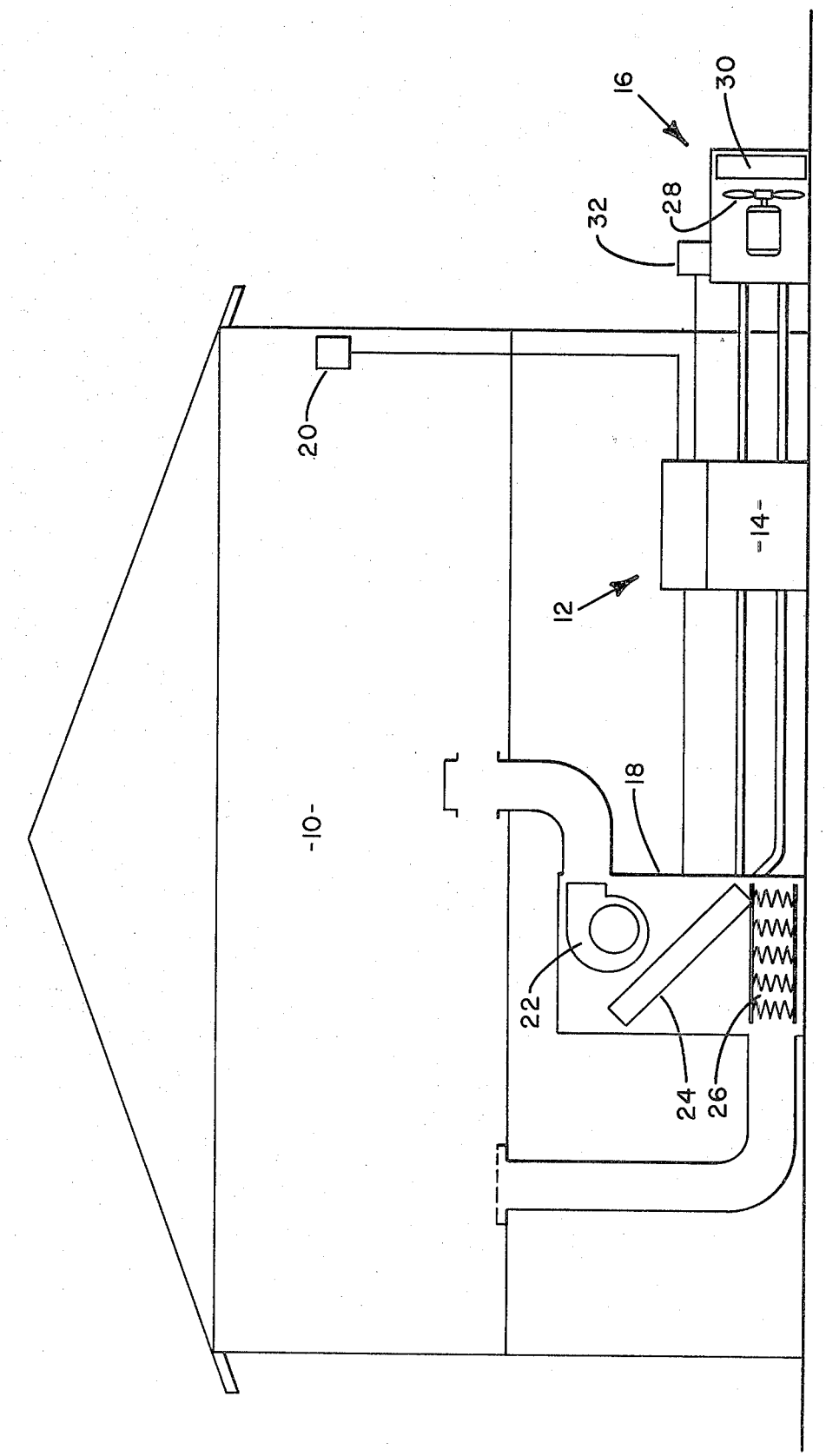
FIG. 1 is a schematic diagram of a heat pump system.

Referring now to FIG. 1 there can be seen an enclosure 10 having an indoor unit 18 mounted in communication with the air in the enclosure. An indoor fan 22 is provided for circulating air through indoor heat exchanger 24 and electrical resistance heaters 26. A heat pump system 12 has a compressor section 14 wherein the multiple speed compressor and reversing valve are mounted. Outdoor unit 16 contains outdoor heat exchanger 30 and outdoor fan 28 such that outdoor ambient air may be circulated in heat exchange communication with outdoor heat exchanger 30. Thermostat 20 is shown in communication with the air in the enclosure such that the heat pump system operation may be controlled therethrough. Control box 32 is shown attached to the outdoor heat exchanger unit such that various outdoor ambient air temperatures may be ascertained therethrough. The controls to regulate operation of the entire system are typically mounted within the compressor section 14 or indoor unit 18.

Figure 2:
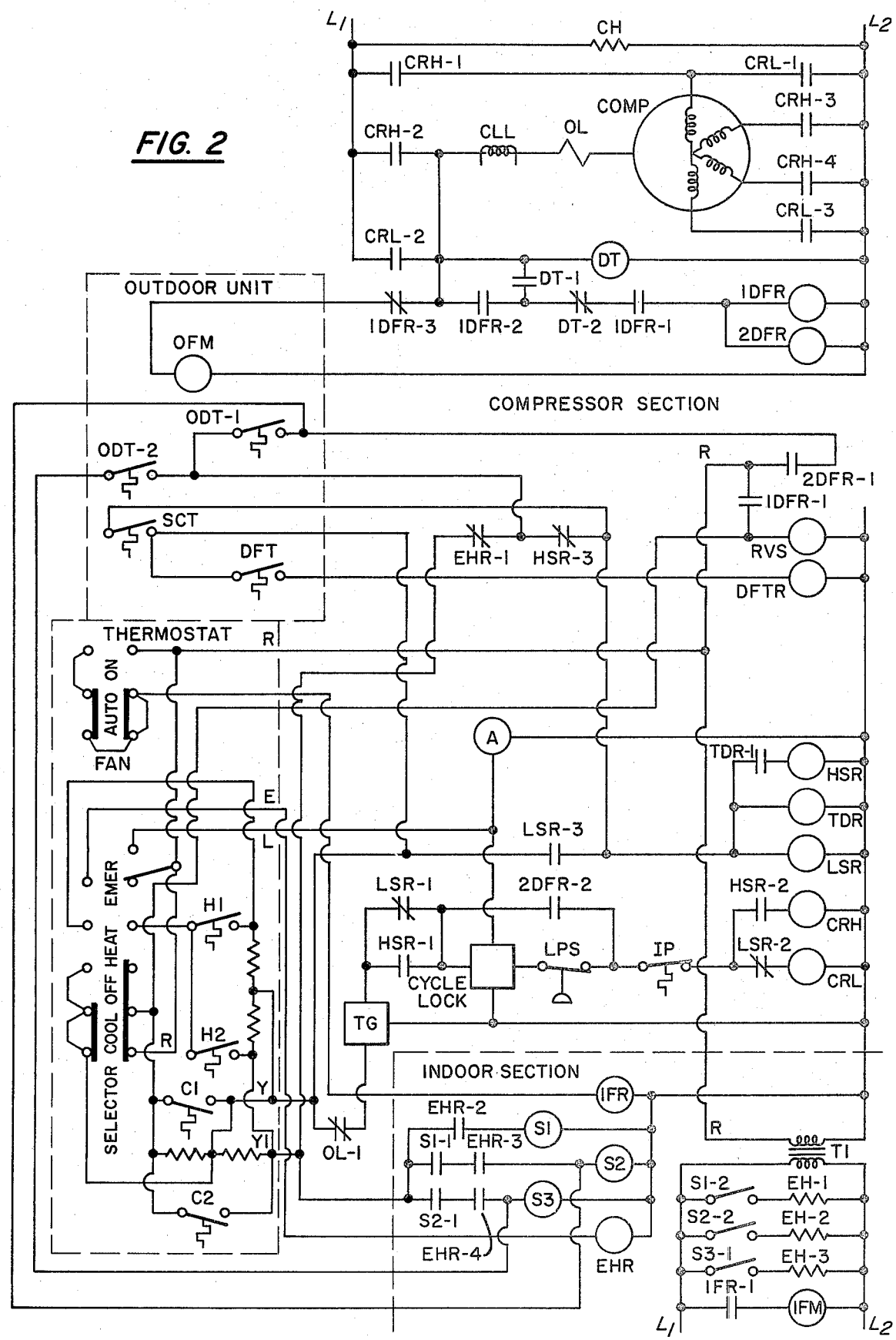
FIG. 2 is a schematic wiring diagram of the control circuit for multiple speed heat pump control system.

Referring now to FIG. 2, the wiring schematic of the control system, it can be seen that the diagram has been divided into various units. Dashed lines have been used to indicate the outdoor unit, the thermostat, and the indoor section. The remainder of the diagram labeled compressor section is typically located within the compressor section of the heat pump system. Commencing with the compressor section, it can be seen that line voltage is supplied through L1 and L2, such that crank case heater CH is energized to provide segregation of oil and refrigerant in the compressor. Also it can be seen that compressor motor COMP is arranged such that its various windings are connected to a series of relays. Compressor high speed relay contacts CRH-1 in the normally open position are connected to a winding of the compressor motor COMP and to normally open compressor relay low speed contacts CRL-1. Normally open compressor relay high speed contacts CRH-2 are connected between L1 and cycle lock loop CLL. Cycle lock loop CLL is connected through overload OL to the compressor motor. Normally open low speed compressor relay contacts CRL-2 are also connected through the cycle lock loop and the overload to the compressor motor. The four windings of the motor are connected respectively to normally open compressor relay low speed contacts CRL-1, normally open compressor relay high speed contacts CRH-3, normally open compressor relay high speed contacts CRH-4, and normally open compressor relay low speed contacts CRL-3.

Defrost timer DT is connected through normally open compressor relay high speed contacts CRH-2 and normally open compressor relay low speed contact CRL-2 between L1 and L2. Also connected to the defrost timer are normally open defrost timer contacts DT-1, normally open defrost relay contacts 1DFR-2 and normally closed defrost relay contacts 1DFR-3. Normally closed defrost relay contacts 1DFR-3 are connected to the outdoor fan motor OFM and to normally open defrost relay contacts 1DFR-2. The 1DFR-2 contacts are connected to normally open defrost timer contacts DT-1 and normally closed defrost contacts DT-2 which in turn are connected through normally open defrost thermostat relay contacts DFTR-1 to first defrost relay 1DFR and the second defrost relay 2DFR.

The thermostat as shown has two switches, a fan switch for operating the fan in either automatic position or an on position, and the selector switch for ascertaining whether the unit should be in the cooling mode of operation, off, heating mode of operation or emergency heat. The fan and selector switches are both bar type switches such that slidably moveable bars are slid between the multiple banks of contacts to connect the appropriate circuits for the mode selected.

Current is supplied to the thermostat and the indoor section controls through transformer T1 which is connected between line voltage L1 and L2 in the indoor section. Specifically one of the coils in transformer T1, normally open sequence relay contacts S1-2 and electric heater EH1, normally open sequence relay contacts S2-2 and electric heater EH2, normally open sequence relay contacts R3-1 and electric heater EH3, and normally open indoor fan relay contacts IFR-1 and indoor fan motor IFM are all connected between L1 and L2 at the indoor section. Transformer T1 supplies current through the wire labelled R to the thermostat at both the fan switch and the selector switch. When it is desirable for the indoor fan to operate current is supplied through the fan switch to wire T which is connected to the indoor fan relay IFR.

When a first cooling need is sensed and the unit is in the cooling mode of operation (selector switch set on cool) the C1 temperature sensing device closes such that the Y wire is energized. The Y wire connects to one terminal of speed control thermostat SCT, one terminal of the defrost thermostat DFT and to the time guard device TG and to the normally open low speed relay contact LSR-3. The second temperature sensing device C2 for determining when a cooling need is required, energizes wire Y1 which is connected to normally closed emergency heat relay contacts EHR-1 and to normally open emergency heat relay contacts EHR-2, to normally open sequence relay contacts S1-1 and to normally open second sequence relay contacts S2-1. When cooling is initially required, wire O is energized from the thermostat. Wire O being connected to the reversing valve solenoid RVS and to normally open defrost relay contacts 1DFR-1. The H1 temperature sensing device which is connected to wire Y, closes when a first stage heating need is sensed. The H2 temperature sensitive device which is connected to wire Y1 closes when a second stage heating need is sensed. Also within the thermostat, wire L is connected such that light A is energized when either the selector switch is placed in the emergency heat position or upon being energized through the cycle lock mechanism to which wire L is connected. Wire E originating at the selector switch is utilized to trip emergency heat relay EHR when it is desirable to operate the unit on electrical resistance heat.

Time guard device TG, provides a time delay between the first cooling need being sensed and the compressor being energized. The time guard device TG is connected thru normally closed overload contacts OL-1 to wire Y, to normally closed low speed relay contacts LSR-1, and to normally open high speed relay contacts HSR-1. Normally open high speed relay HSR-1 and normally closed low speed relay contacts LSR-1 are both connected to cycle lock and to normally open second defrost relay contacts 2DFR-2. Cycle lock acts with the cycle lock loop shown in the compressor section of the diagram as CLL to determine a low current flow to the compressor. If this condition is sensed, light A is energized through wire L. Cycle lock is connected through low pressure switch LPS to the internal protector IP of the compressor motor which is connected in turn to normally closed low speed relay contact LSR-2 which are connected to compressor low speed relay CRL. Internal protector IP and normally closed low speed relay contact LSR-2 are also connected to normally open high speed relay contacts HSR-2 which are connected to compressor high speed relay CRH. The second defrost relay contacts 2DFR-2 are also connected to the low pressure switch LPS and the internal protector IP.

The normally open low speed relay contacts LSR-3 are connected to low speed relay LSR, to time delay relay TDR which acts to provide a time delay between energization of the low speed relay and the high speed relay, and to normally open time delay relay TDR-1 contacts which are connected to the high speed relay HSR. The speed control thermostat SCT is also connected to the low speed relay LSR and the high speed relay HSR thru the time delay relay contacts TDR-1.

The normally closed emergency heat relay contacts EHR-1 are connected to one terminal of the outdoor thermostat ODT-1 and one terminal of the outdoor thermostat ODT-2, to the normally closed high speed relay contacts HSR-3 which are in turn connected to the normally open low speed relay contacts LSR-3, time delay relay TDR and low speed relay LSR.

Defrost thermostat DFT is connected between wire Y and defrost thermostat relay DFTR. Wire O is connected to reversing valve solenoid RVS which is also connected to normally open first defrost relay contacts 1DFR-1 which are connected to normally open second defrost relay connects 2DFR-1 and to wire R. The 2DFR-1 contacts are connected to normally open emergency heat relay 3 contacts and the S2 sequence relay and one terminal of outdoor thermostat ODT-1. One terminal of outdoor thermostat ODT-2 is connected to the normally open emergency heat relay contacts EHR-4 and to sequence relay S3.

Wire Y1 is connected to normally open emergency heat relay contact EHR-2 which are connected to sequency relay S1. Wire Y is additionally connected to normally open sequence 1 relay contacts S1-1 which are connected to normally open emergency heat relay contacts EHR-3 which are connected to sequence 2 relay S2. Wire Y is additionally connected to normally open sequence relay 2 contacts S2-1 which are connected to normally open emergency heat relay contacts EHR-4 which are connected to the sequence 3 relay S3 and to a terminal on the second outdoor thermostat ODT-2.

Operation

During cooling season when the unit is to be operated in the cooling mode of operation the selector switch of the thermostat is set in the cool position and current is supplied from the transformer through wire R to wire O which energizes reversing valve solenoid RVS such that refrigerant will be routed through the heat pump system to supply cooling to the enclosure. Upon a cooling demand being sensed by a predetermined rise in temperature, temperature sensing device C1 will close, energizing wire Y which will in turn energize via time guard TG through the normally closed low speed relay contacts LSR-1, through cycle lock, through the normally closed low pressure switch LPS, through internal protector IP, and through normally closed low speed relay contact LSR-2 to the compressor low speed relay CRL. Once compressor low speed relay CRL is energized, the normally open compressor low speed relay contacts CRL-1, CRL-2 and CRL-3 close providing a complete circuit for energizing the low speed windings of the compressor motor COMP such that the compressor motor will be operated at low speed supplying cooling to the enclosure.

Should the C2 temperature sensitive device close, indicating a higher temperature within the enclosure and that additional cooling is necessary then through wire Y1, through normally closed emergency heat relay contacts EHR-1, and through normally closed high speed relay contacts HSR-3, the low speed relay LSR and the time delay relay TDR will be energized. Consequently the normally closed low speed relay contacts LSR-1 and LSR-2 will open preventing the operation of the compressor motor through the compressor low speed relay CRL. The normally open low speed relay contact LSR-3 will close providing a current flow path from wire Y to the time delay relay and the low speed relay. After a predetermined time period elapsed the normally open time delay relay will close energizing high speed relay HSR. Upon the high speed relay being energized the normally open HSR high speed relay contacts HSR-1 and HSR-2 will close forming a current flow path from wire Y through time guard through normally open and now closed high speed relay contacts HSR-1, through cycle lock, through low pressure switch LPS and internal protector IP through the normally open and now closed high speed relay contact HSR-2 to the compressor high speed relay CRH which is then energized. Once the compressor high speed relay is energized the compressor high speed relay contacts CRH-1, CRH-2, CRH-3, CRH-4 are energized providing current to the high speed windings of the compressor motor such that the compressor is operated at high speed.

In the heating mode of operation wire Y is energized through temperature sensing device H1 upon the air of the enclosure dropping to a first predetermined level. Wire Y acts to energize through the same components in the heating mode of operation as it did in the cooling mode of operation to operate the compressor at low speed. Since wire O is not energized, the reversing valve solenoid is also not energized. Hence the reversing valve is in the heating position and the heat pump supplies heat energy to the enclosure instead of cooling. Upon the temperature in the enclosure falling further, the H2 temperature sensitive device closes energizing wire Y1 which also acts as the cooling mode of operation to engage operation of the compressor on a high speed mode such that additional heating is supplied to the enclosure.

In addition to the described circuitry to switch the unit between high speed operation and low speed operation, when the unit is in the heating mode of operation, the first stage heating which is energized thru wire Y is connected to the speed control thermostat SCT. The speed control thermostat is preset to close at a predetermined outdoor ambient air temperature. This outdoor temperature is selected at that point where the low speed heating mode of operation is less efficient than the high speed mode of operation. Once the speed control thermostat SCT closes it energizes the low speed relay LSR and time delay relay TDR and eventually the high speed relay HSR. Consequently the temperature within the enclosure will not have to fall to the level detected by temperature sensitive device H2 prior to high speed operation being commenced when the outdoor temperature is below the speed control thermostat set point. Outdoor thermostats ODT-1 and ODT-2 are provided in communication with outdoor ambient air such that under the appropriate circumstances electrical resistance heaters will be energized when the outdoor ambient air temperature falls below the set points for these two sensing devices. It can be seen that wire Y1 supplies from normally closed emergency heat relay contacts EHR-1 current to both outdoor thermostats ODT-1 and ODT-2. Once either of these thermostats closes current is supplied to either sequence relay S2 or sequence relay S3 which operates to close the sequence S2-2 contacts which energize emergency heater EH2 or sequence relay 3 which acts to *energize the S3-1 contacts which energize emergency heater EH3. Consequently, additional supplementary electrical heat is provided to the enclosure when the outdoor ambient temperature falls below the temperature levels set for these two outdoor thermostats.

In addition it may be necessary to defrost the outdoor heat exchanger coil in the heat pump under certain circumstances. To ascertain whether or not defrost is necessary, a defrost timer is utilized to periodically cycle and ascertain if the defrost thermostat relay DFTR is closed. Wire Y is connected such that at all times the compressor is in operation the defrost thermostat relay DFTR may be energized if the defrost thermostat is closed indicating the presence of ice. The defrost thermostat DFT is in heat sensing communication with the outdoor air or the outdoor heat exchanger depending upon the design choice such that under the appropriate ambient air conditions and refrigerant system conditions the defrost thermostat relay DFTR will be energized. Once the defrost thermostat relay is energized the normally open defrost thermostat relay contacts DFTR-1 will be closed allowing defrost to be commenced upon the appropriate defrost timer sequence.

The defrost timer DT is connected such that it will continually operate when the compressor is operated through either the compressor low speed relay contacts CRL-2 or thru the compressor high speed relay contacts CRH-2. At predetermined time intervals such as every 90 minutes, the defrost timer will act to close normally open defrost timer contacts DT-1 such that current may be supplied through the normally open but now closed defrost timer contact DT-1, through the normally closed defrost timer contacts DT-2, through the normally open but now closed defrost thermostat relay contacts DFTR-1 to energize first and second defrost relays 1DFR and 2DFR. Once the defrost relays are energized then the normally closed first defrost relay contacts 1DFR-3 are opened discontinuing operation of the outdoor fan motor and the normally open first defrost relay contacts 1DFR-2 are closed providing a current flow path to the defrost relays such that when the first defrost timer contacts DT-1 open after a predetermined period such as ten seconds, there will still be a current path available for energizing the defrost relays and operating the unit in the defrost mode of operation. Once the defrost relays are energized the normally open first defrost relay contacts 1DFR-1 and the normally open second defrost relay contacts 2DFR-1 and 2DFR-2 are closed. Current is then supplied through the normally open and now closed first defrost relay contacts 1DFR-1 to the reversing valve solenoid such that the reversing valve is energized and heat is then supplied to the outdoor heat exchanger to melt the ice thereon. Current is also supplied from wire R and through the normally open and now closed second defrost relay contacts 2DFR-1 to the normally open emergency heat relay EHR-3 contacts and to the S2 sequence relay such that the normally open S2-2 contacts are closed energizing electrical heater EH2 supplying additional electrical resistance heat to the enclosure. In addition the now closed but normally open second defrost relay contacts 2DFR-2 bypass low pressure switch LPS such that the unit may be operated in defrost regardless of the internal pressure of the system.

An emergency heat position is also provided such that thru the selector switch in the thermostat emergency heat relay EHR may be energized closing normally open emergency heat relay contacts EHR-2, EHR-3 and EHR-4 and opening normally closed emergency heat relay contacts EHR-1. Once the normally open EHR-2 contacts are closed sequence relay S1 is energized which through normally open sequence relay contacts S1-2 energizes emergency heater EH-1. If the heat provided by emergency heater EH-1 is insufficient to meet the demand on the enclosure, then after a predetermined time period the S1-1 normally open contacts close, energizing sequence relay S2 through the normally open and now closed emergency heat relay contacts EHR-3. The sequence relay S2-2 contacts close energizing emergency heater EH-2. Again, if electrical heater EH-2 is insufficient to meet the demand on the enclosure then the normally open sequence relay contacts S2-1 close energizing through the normally open and now closed emergency heat relay contacts EHR-4 sequence relay S3. Sequence relay S3 then through normally open sequence relay contacts S3-1 energizes electrical heater EH-3 to provide additional heating to the enclosure.

Once the emergency heat relay is energized the normally closed emergency heat relay contacts EHR-1 are open preventing operation of the electrical resistance heaters through the outdoor thermostat switches ODT-1 and ODT-2.

The invention has been described in reference to a particular preferred embodiment and it is to be understood by those experienced in the art that variations and modifications can be made within the spirit and scope of the invention.

What is claimed is:

1. A control circuit for air conditioning apparatus for providing heating and cooling to an area to be conditioned including a refrigeration system having indoor and outdoor heat exchangers, a compressor powered by a multispeed motor, and expansion means connected to form a refrigerant flow control circuit which comprises:
   means for energizing the compressor motor at low speed,
   means for energizing the compressor motor at high speed,
   means for switching between the cooling mode of operation and the heating mode of operation,
   a first temperature sensitive means in communication with the air in the enclosure, said first temperature sensitive means being connected in both the cooling mode and the heating mode to the means for energizing the compressor motor at low speed upon the temperature of the enclosure varying a first predetermined amount and to the means for energizing the compressor motor at high speed upon the temperature in the enclosure varying a second predetermined amount;
   a second temperature sensitive means in communication with outdoor ambient air responsive only in the heating mode for energizing the means for actuating the compressor motor at high speed regardless of whether or not the temperature in the enclosure varied the second predetermined amount when the ambient air temperature is below a first predetermined level; and defrost means for operating the refrigeration system in the cooling mode when a defrost need is sensed.

2. The apparatus as set forth in claim 1 and further including:

electrical resistance heaters connected to be energized upon an emergency heat mode of operation being selected or upon a third temperature sensitive means ascertaining an outdoor ambient air temperature below a second predetermined level and the first temperature sensitive means having sensed the temperature variation of the second predetermined amount in the enclosure.

3. The apparatus as set forth in claim 2 and further including a fourth temperature sensitive means for ascertaining an outdoor ambient air temperature within a third predetermined range such that additional electric resistance heaters may be energized.

4. The apparatus as set forth in claim 1 wherein upon the means for energizing the compressor motor at low speed being engaged the means for actuating the compressor motor at high speed may not be engaged and upon the means for actuating the compressor motor at high speed being engaged the means for energizing the compressor motor at low speed may not be engaged.

5. The apparatus as set forth in claim 1 and further including means for sequentially energizing electrical resistance heaters to supply heating to the enclosure in addition to that provided by the refrigeration system.

6. A method of controlling air conditioning apparatus supplying conditioned air to an enclosure, including a refrigeration system capable of being operated to provide either heating or cooling having a compressor powered by a multi-speed motor, an indoor heat exchanger, an outdoor heat exchanger, and expansion means which comprises the steps of:

sensing the temperature of the air in the enclosure;
energizing the compressor motor to provide heating in the first speed of operation when the temperature of the enclosure air falls below a first level;
energizing the compressor motor to provide heating at a second speed of operation when the temperature of the enclosure air falls below a second level;
sensing the temperature level of the outdoor ambient air; and
energizing the compressor motor to provide heating in a second speed of operation regardless of whether the indoor air has reached the second level when the outdoor air is below a first predetermined level.

7. The method as set forth in claim 6 and further including the step of:

energizing electric resistance heaters upon the outdoor ambient temperature being below a second predetermined level.

8. The method as set forth in claim 6 and further including the step of:

defrosting the outdoor heat exchanger under the appropriate conditions.

9. The method as set forth in claim 6 and further including the steps of:

preventing the step of energizing the compressor motor in the first speed of operation when it is energized in the second speed of operation; and
preventing the step of energizing the compressor motor in the second speed of operation when it has been energized in the first speed of operation.

10. The method as set forth in claim 6 and further including the step of:

staging electrical resistance heaters to supply heating to the enclosure upon manual demand.

11. The method as set forth in claim 6 and further including the step of:

delaying the step of operating the compressor motor at a second speed of operation for a time period after the compressor motor has been operated at the first speed of operation.

12. A reversible vapor compression refrigeration system for supplying heating and cooling to an enclosure having an indoor heat exchanger, an outdoor heat exchanger, a reversing means, an expansion means and a compressor capable of multi-speed operation connected to a multi-speed motor which comprises:

means for energizing the motor in a first speed of operation;
means for energizing the motor at a second speed of operation;
a first temperature sensitive device connected to actuating the means for energizing the motor at the first speed of operation when the temperature of the enclosure falls below the first level;
a second temperature sensitive device connected to actuate the means for energizing the motor at a high speed of operation when the temperature of the enclosure falls below a second predetermined level;
a third temperature sensitive device connected to actuate the means for energizing the motor at a low speed of operation if the temperature of the enclosure rises above a third predetermined level;
a fourth temperature sensitive device connected to actuate means for energizing the motor at a high speed of operation if the temperature of the enclosure rises above a fourth predetermined level;
means for energizing the reversing means when the unit is in the cooling mode of operation; and
a fifth temperature sensitive device in communication with the outdoor ambient air for energizing the means for energizing the motor at a second speed of operation when the unit is in the heating mode of operation and the outdoor ambient air temperature falls below a fifth predetermined level.

* * * * *